United States Patent
Ko

(10) Patent No.: US 6,840,702 B2
(45) Date of Patent: Jan. 11, 2005

(54) JOINT BETWEEN TUBES OF A TUBE COMBINATION HAVING ANNULAR TRENCHES

(76) Inventor: Chin-Shan Ko, No. 376, Lane 464, Sec. 7, Jangshin Rd, Shengeng Shiang, Changhua (TW)

( * ) Notice: Subject to any disclaimer, the term of this patent is extended or adjusted under 35 U.S.C. 154(b) by 0 days.

(21) Appl. No.: 10/361,756

(22) Filed: Feb. 11, 2003

(65) Prior Publication Data

US 2004/0156674 A1 Aug. 12, 2004

(51) Int. Cl.$^7$ .................................................. F16B 7/00
(52) U.S. Cl. ...................... 403/292; 403/294; 403/296; 403/300; 403/305
(58) Field of Search ............................. 403/187, 192, 403/194, 200, 292, 294, 296, 300, 301, 305, 335, 336; 285/370, 390, 334.1, 334.2

(56) References Cited

U.S. PATENT DOCUMENTS

| 4,068,346 | A | * | 1/1978 | Binder | ...................... 16/110.1 |
| 5,022,777 | A | * | 6/1991 | Kolvites | ...................... 403/14 |
| 5,704,728 | A | * | 1/1998 | Chan | ........................... 403/298 |
| 6,073,642 | A | * | 6/2000 | Huang | ........................ 135/114 |

* cited by examiner

Primary Examiner—John R. Cottingham
Assistant Examiner—Michael P. Ferguson
(74) Attorney, Agent, or Firm—Rosenberg, Klein & Lee

(57) ABSTRACT

A tube combination has upper and lower tubes, which are joined together with a coupling, and which have spaced annular trenches on outer sides. Annular projections are formed on the upper end of the lower tube and the lower end of the upper tube; the annular projections are pressed against each other when the tubes are joined together, and are shaped such that they together are in the shape of the annular trenches when the tubes are joined together, making the tube combination look like one having a single tube part.

4 Claims, 9 Drawing Sheets

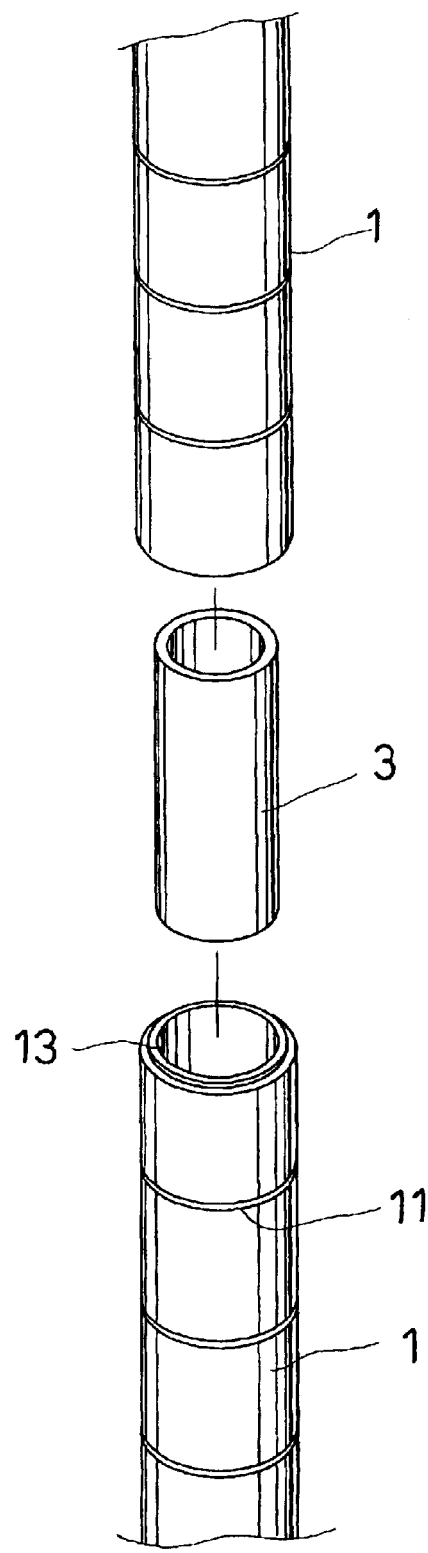
F I G. 3

JOINT BETWEEN TUBES OF A TUBE COMBINATION HAVING ANNULAR TRENCHES

BACKGROUND OF THE INVENTION

1. Field of the invention

The present invention relates to a tube combination, more particularly a tube combination, which has a coupling for connecting two tube parts thereof together, which is relatively easy and safe to use and relatively economical to manufacture.

2. Brief Description of the Prior Art

Steel tubes are widely used on furniture such as beds, desks, racks, and chairs because they are light in weight and can be easily shaped. Early conventional steel tubes were not formed with ornamental designs on the cylindrical surfaces therefore they can't match other parts of furniture. To make steel tubes look attractive and match other parts of furniture, annular trenches are formed on the steel tubes. The annular trenches can also help other parts of furniture located when they are joined to the steel tubes.

Referring to FIGS. 7, 8, and 9, a tube combination has a coupling 42, upper and lower tubes 41, 41, which have spaced annular trenches 411 on the outer sides and threads on inner sides of two ends, and are joined together by means of the coupling 42; the coupling 42 has threads 421, 421 on outer sides of upper and lower ends, and a middle rim 422, which is made with such a shape as to make the joint between the tubes 41, 41 look like the trenches 411 when the coupling 42 are connected to the tubes. And, when the tube combination is joined to grilles 43 to form a rack, as shown in FIGS. 8 and 9, connecting tube elements 432 of the grilles 43, which have annular protrusions 433 on inner sides, can engage selected ones of the annular trenches on the tube combination easily. In other words, the grilles 43 can be easily located and secured in position owing to the annular trenches. However, the tube combination is found to have disadvantages as followings:

1. The coupling 42 is costly to manufacture because it is formed with threads 421 on two ends, and a middle rim 422, which is bigger than the threaded ends in diameter, and in turn, the coupling 42 has to be made by means of cutting deeply into the curved surface of a cylindrical element with a lathe, cutting a lot of portions out of the cylindrical element. Furthermore, the coupling 42 has to be made of a material of solid cylindrical shape instead of a hollow cylindrical tube because the material has to have relatively big thickness for allowing the cutting as described above and because ordinary easily available tubes don't have such a big thickness. And, the cylindrical material has to be formed with a hole 423. Consequently, a lot of portions are cut out of the material, and become waste.

2. Manufacturing of the tube combination is difficult and labor-costing; a cylindrical material has to be formed with threads at two ends to become the coupling 42, and both of the tubes 41 have to be formed with threads on the inner sides of the ends therefore relatively many cutting processes have to be performed, and in turn, manufacturing of the tube combination is costly.

3. Assembly of the tube combination may cause injure to the persons performing the assembly; the users have to first hold a first threaded end of the coupling 42 to screw the other end into a tube 41, and then screw the other end into the other tube therefore the users are prone to injure the fingers due to the sharp ends of the threads. Furthermore, the assembly is labor-costing because the coupling 42 has to be screwed into the tubes at both ends.

SUMMARY OF THE INVENTION

It is an object of the present invention to provide a tube combination, which has tube parts having spaced annular trenches on outer sides, and a coupling joining the tube parts together, such that a joint between the tube parts is in the shape of the annular trenches to make the tube combination attractive.

It is another object of the present invention to provide a coupling to tube parts of a tube combination, which is relatively economical to manufacture, and allows the tube parts to be easily joined together with it.

It is yet another object of the present invention to provide a coupling to tube parts of a tube combination, which is formed with threads on only a first end so that a user can first hold the other end, which has no threads formed on it, to screw the first end into one of the tube parts in assembly. Therefore, the user's fingers can't get injured with the threads.

It is still another object of the present invention to provide a coupling to tube parts of a tube combination, which is made of an easily available tube so that cost of manufacturing and material of the tube combination is reduced.

BRIEF DESCRIPTION OF THE DRAWINGS

Present invention will be better understood by reference to the accompanying drawings, wherein FIG. 3 is an exploded perspective view of the tube combination of the second embodiment of the present invention.

DETAILED DESCRIPTION OF THE PREFERRED EMBODIMENTS

Figure 1:
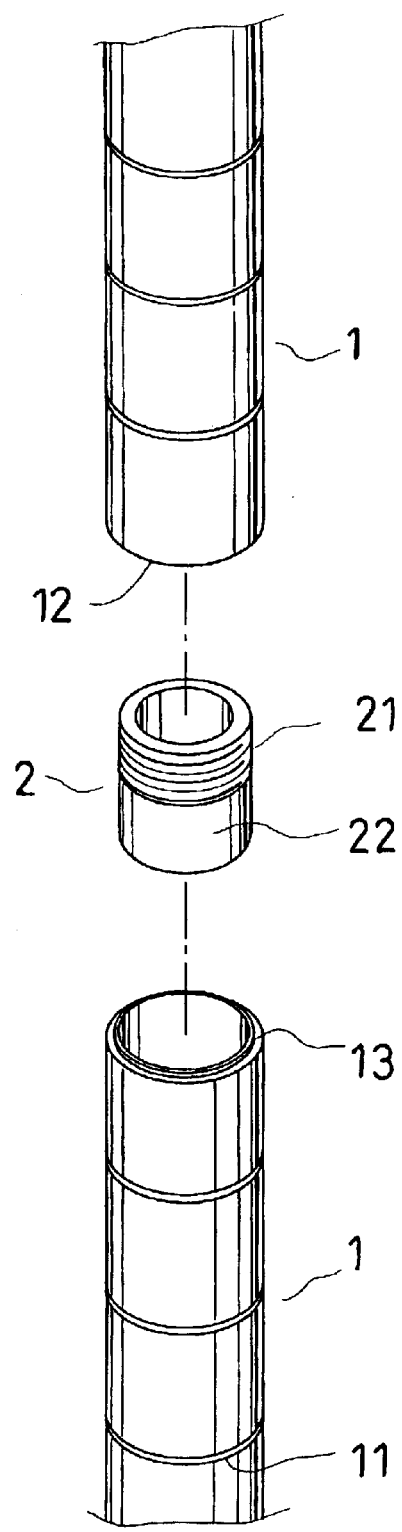
FIG. 1 is an exploded perspective view of the tube combination according to the present invention.
Figure 2:
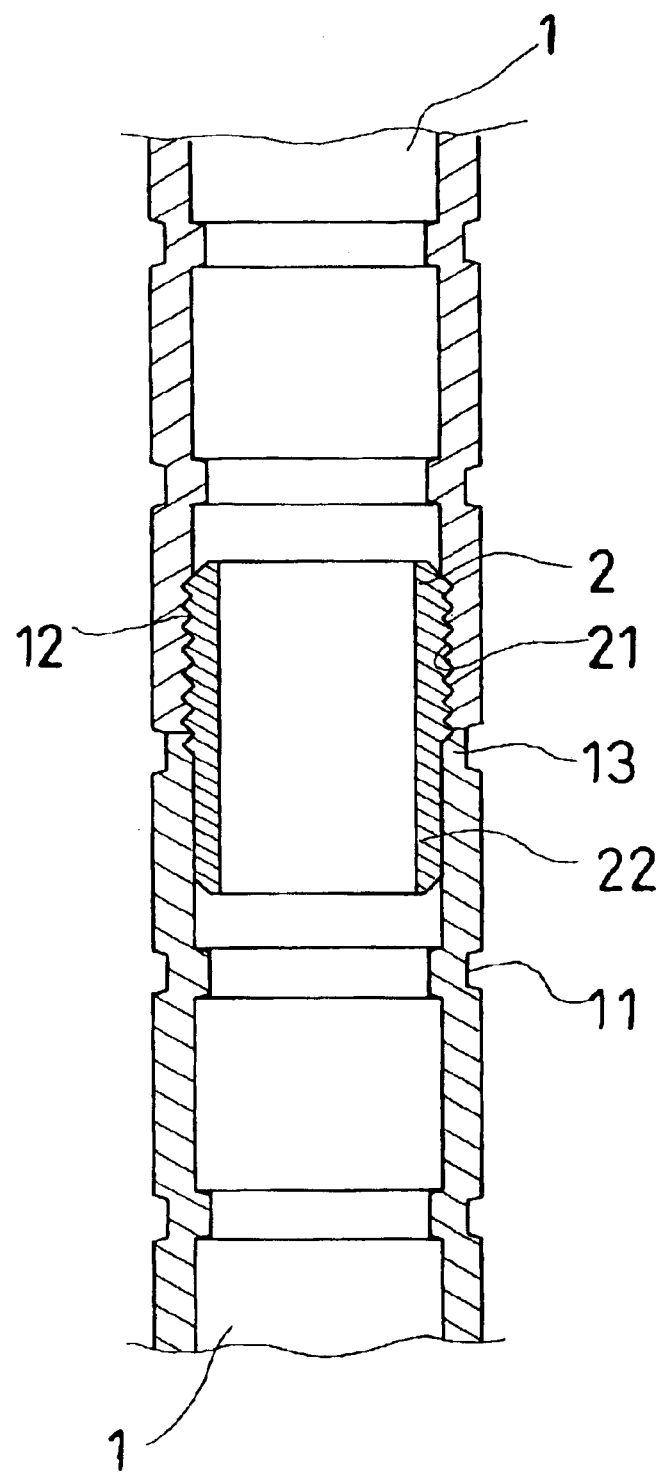
FIG. 2 is a cross-sectional view of the tube combination according to the present invention.

Referring to FIGS. 1, and 2, a tube combination of the present invention includes upper and lower cylindrical tubes 1, 1, and a coupling 2 for joining the tubes together; the upper tube has spaced annular trenches 11 on an outer side, and threads 12 on an inner side of a lower end thereof; the lower tube has spaced annular trenches 11 on an outer side, an annular projection 13 sticking up from an upper end, and threads extending a relatively short distance on an inner side of the upper end; the coupling 2 is made by means of forming threads 21 on an outer side of a first end thereof, and has a second end 22, which has no threads on it, and which is formed so that the outer diameter thereof is equal to the inner diameter of the lower tube 1.

In assembly, one first holds the second end 22, and screws the first threaded end of the coupling 2 into the lower end of the upper tube; a few lower ones of the threads 21 are not screwed into the lower end of the upper tube. Then, the second end 22 of the coupling 2 is passed into the upper end of the lower tube, and the lower ones of the threads 21 are screwed into the upper end of the lower tube. From the above description, it can be understood that the coupling 2 is much easier and less costly to manufacture than that of the prior art one as described in the Background because it can be made by only forming threads on one end of an easily available tube and cutting into the lower end 22 for only a relatively small depth. In addition, the coupling 2 is safe. to use, and the users won't injure the fingers because they don't have to hold the threaded portion of the coupling 2 when they are assembling the tube combination.

Figure 4:
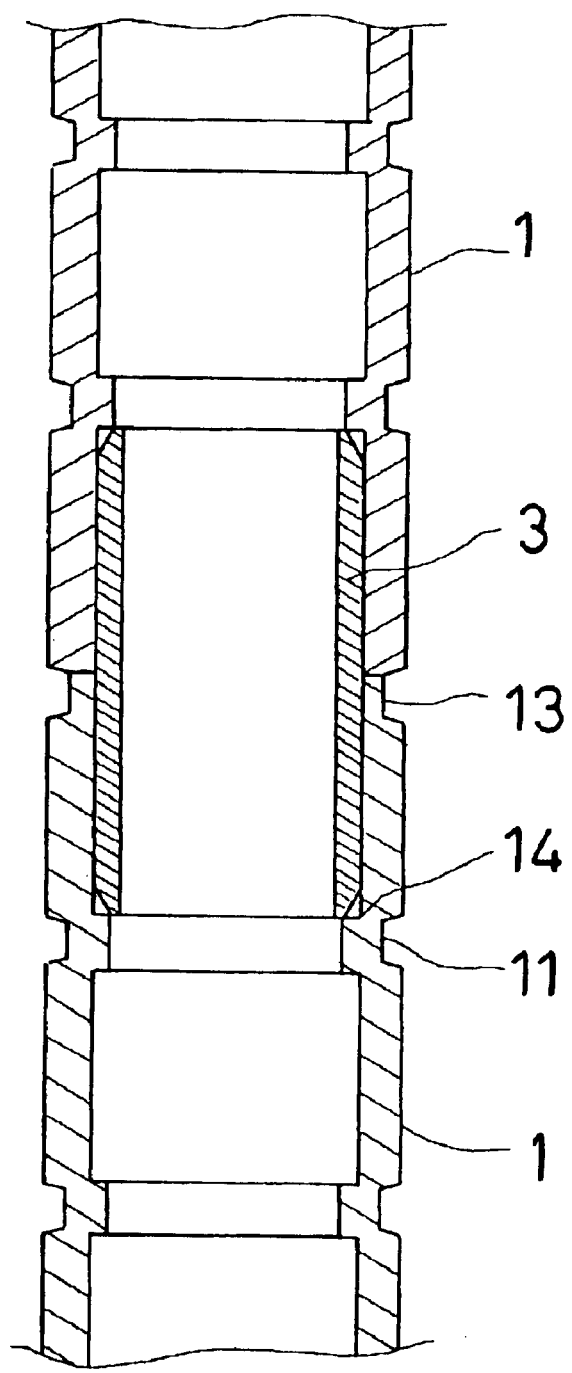
FIG. 4 is a cross-sectional view of the tube combination of the second embodiment of the present invention.

Referring to FIGS. 3, and 4, a tube combination of the second embodiment includes a coupling 3, and upper and lower tubes 1, 1 having spaced annular trenches 11 formed on the outer sides; the coupling 3 is a cylindrical tube, of which the outer diameter is substantially equal to the inner diameter of the tubes 1; the tubes have inner annular stopping protrusions 14 corresponding to the trenches 11 thereof. In assembly, the coupling 3 is inserted into a lower end of the upper tube and an upper end of the lower tube with two ends thereof being stopped by the inner protrusions 14 of the tubes 1. Therefore, the tube combination is relatively easy to assemble.

Figure 5:
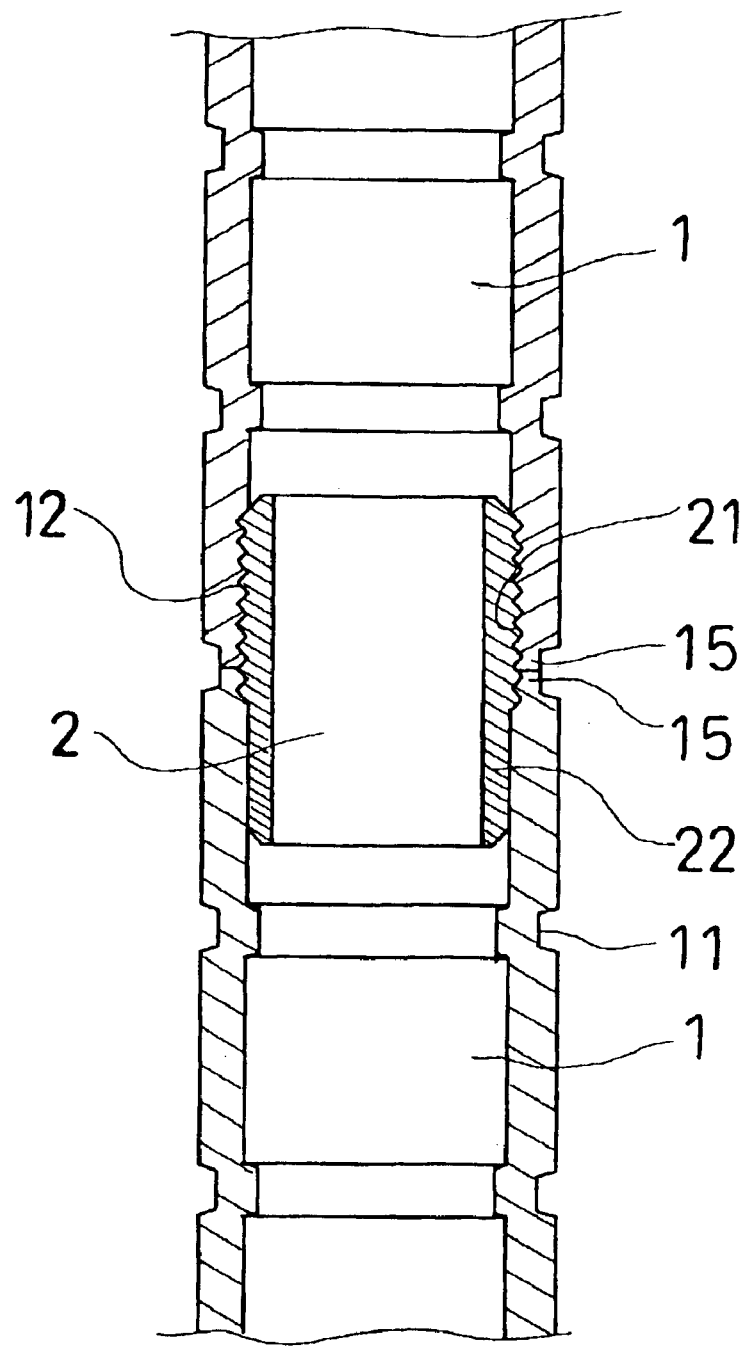
FIG. 5 is a cross-sectional view of the tube combination of the third embodiment of the present invention.

Referring to FIG. 5, a tube combination of the third embodiment includes a coupling 2 the same as that of the first embodiment, and upper and lower tubes 1, 1, which have annular trenches 11, and threads like those of the first embodiment. The upper and lower tubes 1, 1 further have annular projections 15, 15 sticking up from a lower end, and an tipper end respectively so that when they are joined together with the coupling 2, the annular projections 15, 15 form an annular trench, which is in the shape of the annular trenches 11.

Figure 6:
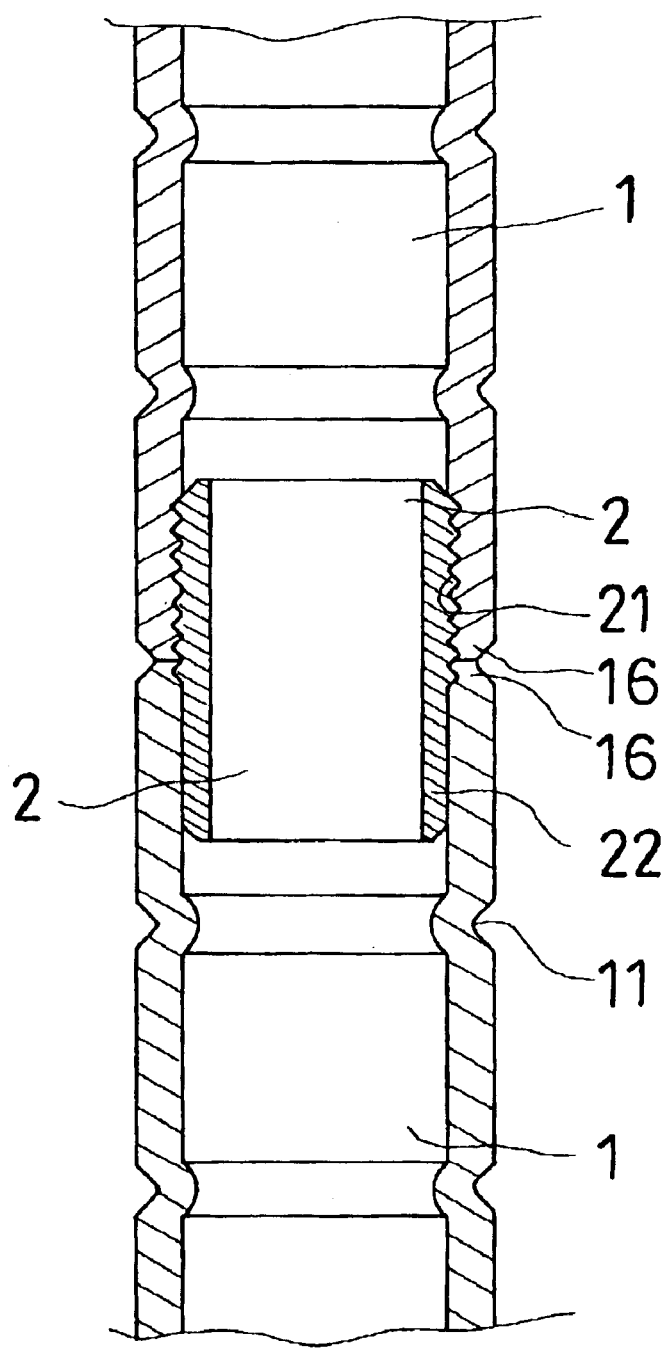
FIG. 6 is a cross-sectional view of the tube combination of the fourth embodiment of the present invention.
Figure 7:
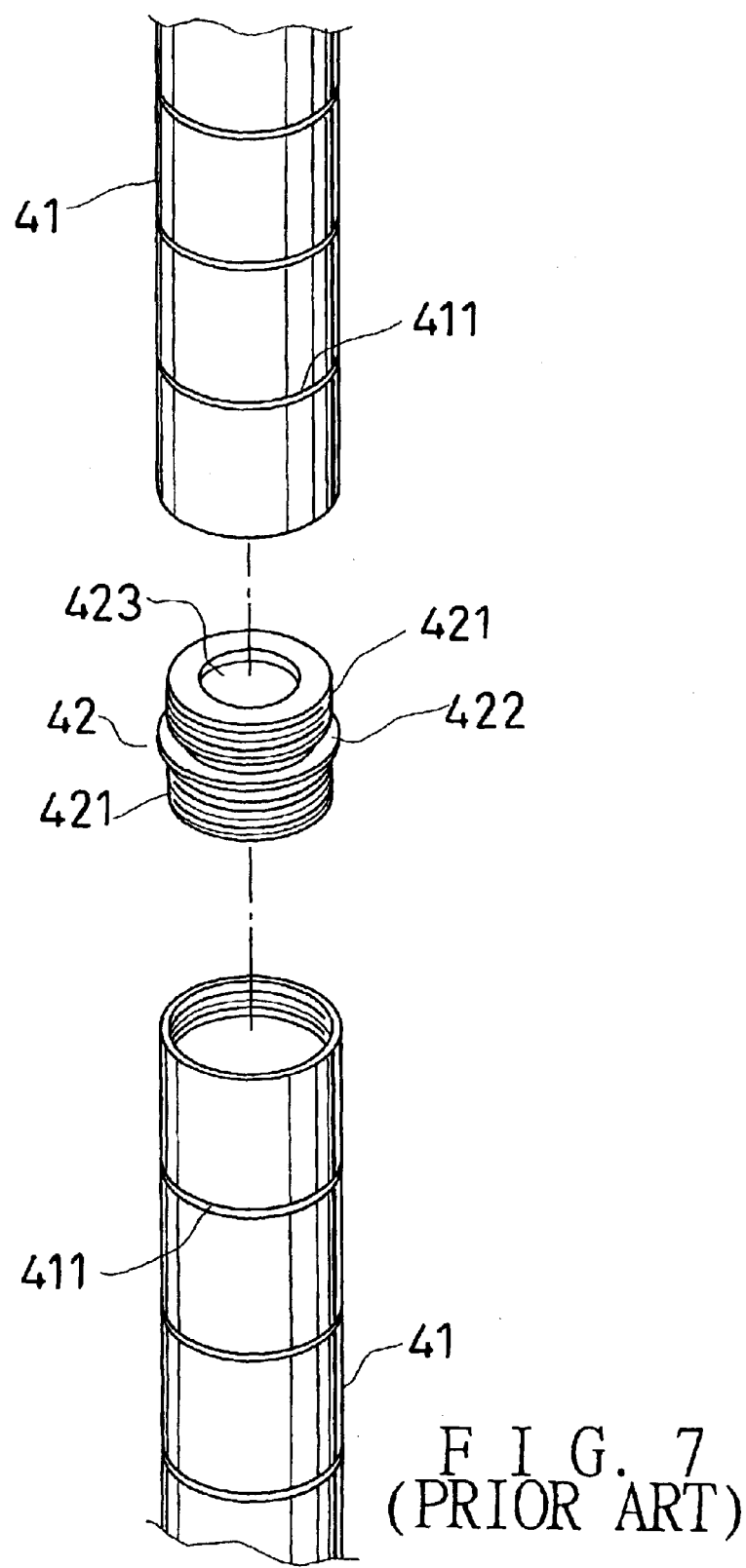
FIG. 7 is an exploded perspective view of the conventional tube combination as described in the Background.
Figure 8:
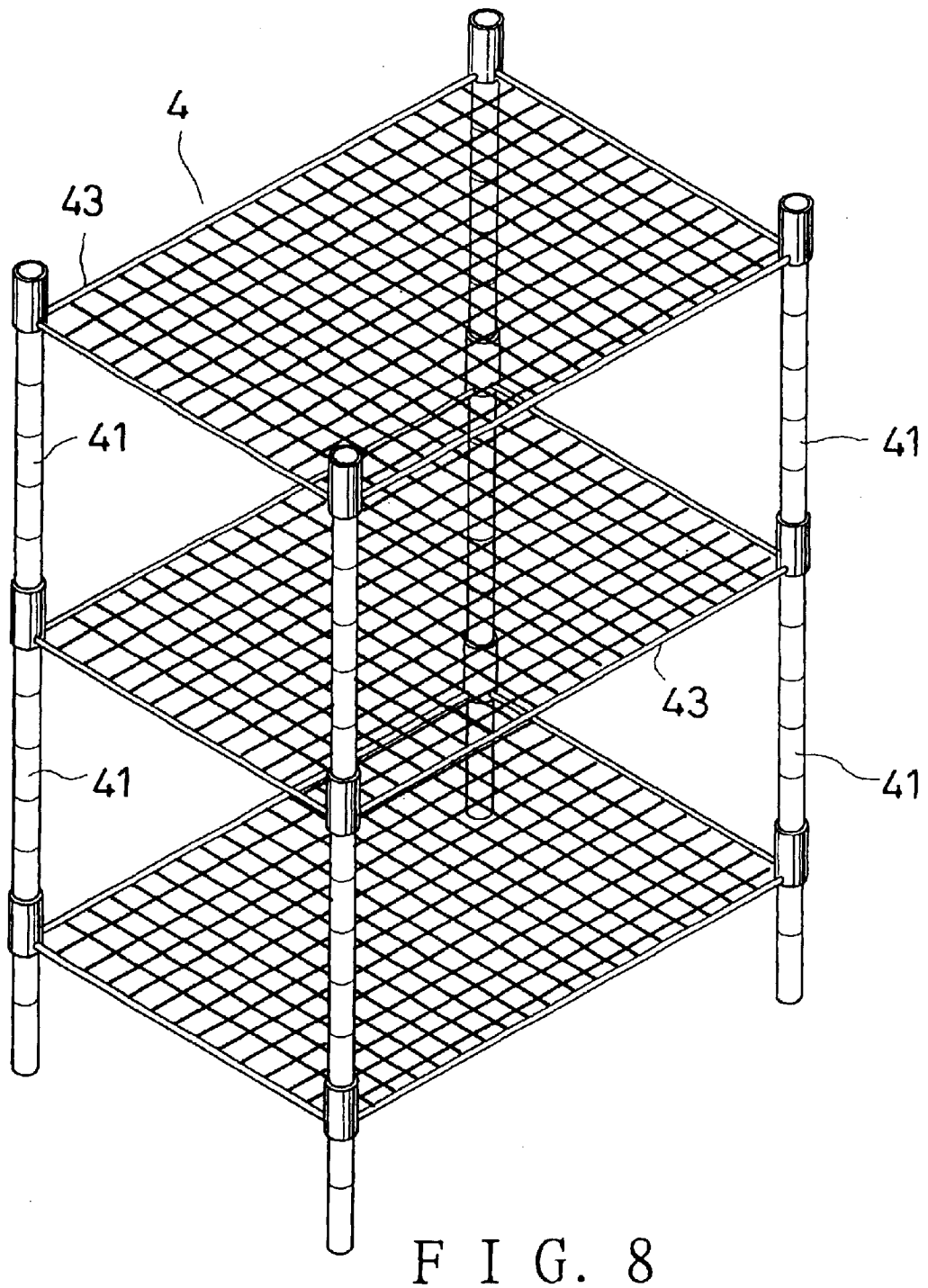
FIG. 8 is a perspective view of a rack having support legs made of cylindrical tubes having annular trenches; and, FIG. 9 is a partial cross-sectional view of the rack in FIG. 8.
Figure 9:
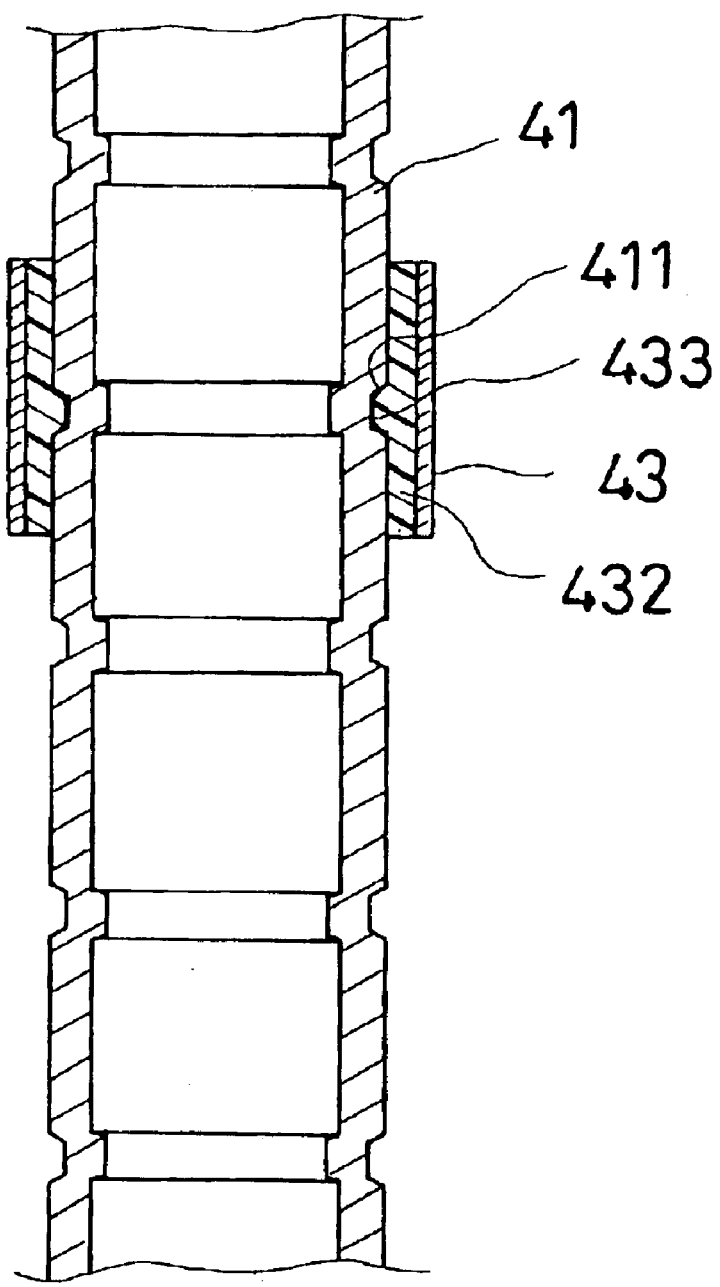

Referring to FIG. 6, a tube combination of the fourth embodiment includes a coupling 2, which is the same as that of the first embodiment, and upper and lower tubes 1, 1, which have spaced annular notches 11 on the outer sides. The upper and lower tubes 1, 1 further have annular projections 16, 16, which stick up from a lower end, and an upper end respectively, and which have sloping outward surfaces, so that when they are joined together with the coupling 2, the annular projections 16, 16 form an annular notch, which is in the shape of the annular notches From the above description, it can be easily seen that the tube combination with the couplings according to the present invention is more economical to manufacture and safer to use than the prior one as described in the Background.

What is claimed is:

1. A joint apparatus between tubes of a tube combination having annular trenches, comprising:

a coupling for joining both upper and lower tubes of a tube combination together, which have spaced annular trenches formed on outer sides; the coupling having a first threaded end portion fitted in a lower end of the upper tube, and having a second end inserted into an upper end of the lower tube; and, an annular projection extending up from the upper end of the lower tube; the annular projection being pressed against the lower end of the upper tube when the tubes are joined together; the annular projection being shaped such that it is in a shape of the annular trenches when the tubes are joined together.

2. A joint apparatus between tubes of a tube combination having annular trenches, comprising:

a coupling for joining both upper and lower tubes of a tube combination together, which have spaced annular trenches formed on outer sides; the coupling being fitted into a lower end of the upper tube and an upper end of the lower tube at two ends; the coupling being stopped from moving in the tubes by protrusions projecting from inner sides of the tubes;

at least one of the upper and lower tubes including an annular projection extending axially from an end thereof; the annular projection being pressed against the other of the upper and lower tubes when the tubes are joined together; the annular projection corresponding in share to the annular trenches when the tubes are joined together.

3. A joint apparatus between tubes of a tube combination having annular trenches, comprising:

a coupling for joining both upper and lower tubes of a tube combination together, which have spaced annular trenches formed on outer sides; the coupling having a first threaded end portion screwed into a lower end of the upper tube, and having a second end fitted in an upper end of the lower tube; and, annular projections extending up from the upper end of the lower tube and the lower end of the upper tube; the annular projections being pressed against each other when the tubes are joined together; the annular projections being shaped such that they together are in a shape of the annular trenches when the tubes are joined together.

4. The joint apparatus between tubes of a tube combination having annular trenches as claimed in claim 3, wherein the spaced annular trenches are in a shape of a notch, and the annular projections have sloping surfaces on outward sides thereof so that they together are in a shape of the spaced annular trenches when the tubes are joined together.

* * * * *